June 14, 1966  E. W. KIELSMEIER ET AL  3,255,689
LIQUID SMOKING MEANS
Filed May 6, 1963
2 Sheets-Sheet 1
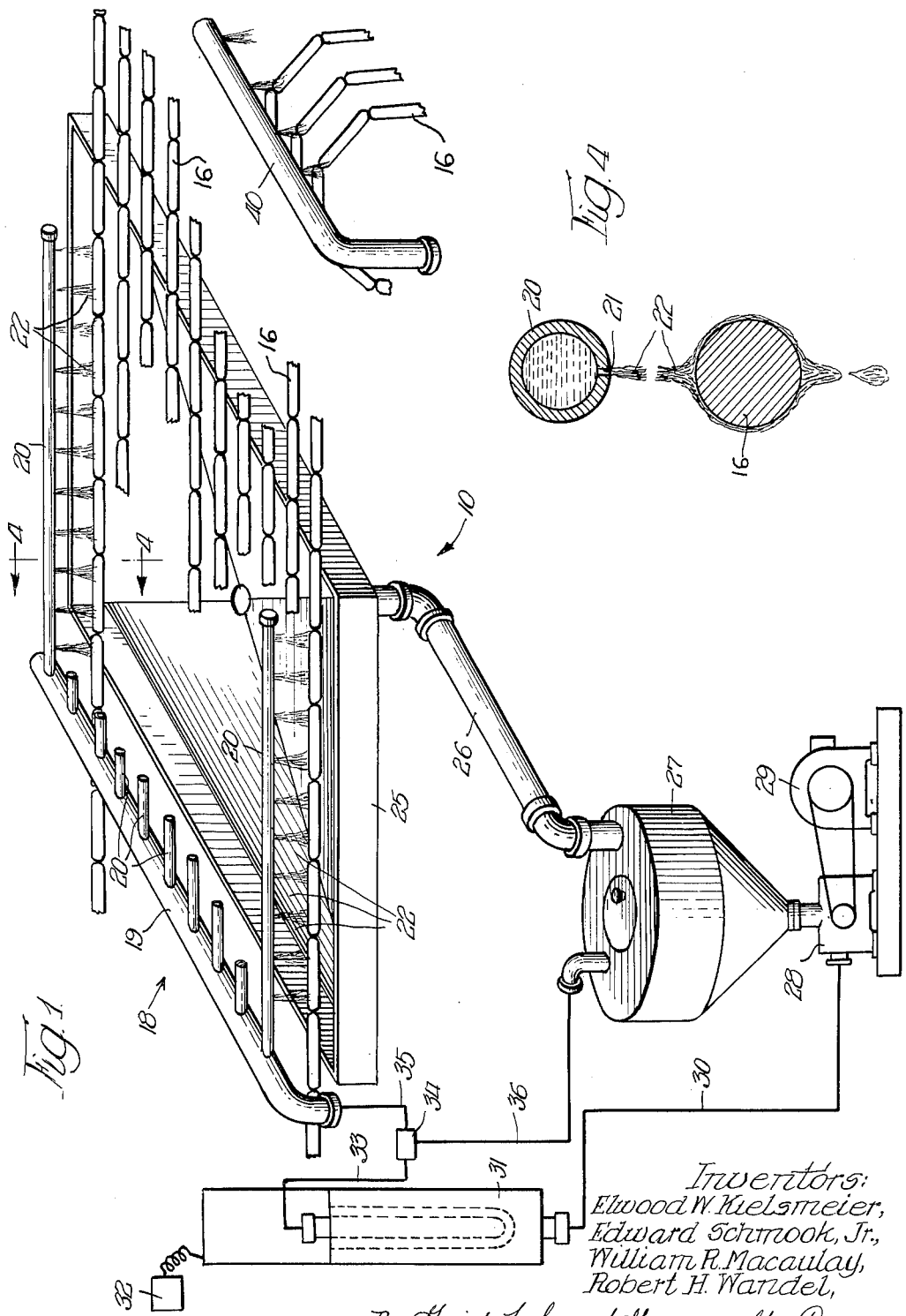
Inventors:
Elwood W. Kielsmeier,
Edward Schmook, Jr.,
William R. Macaulay,
Robert H. Wandel,
By Strist, Lockwood, Grunewalt & Dewey
Attys.

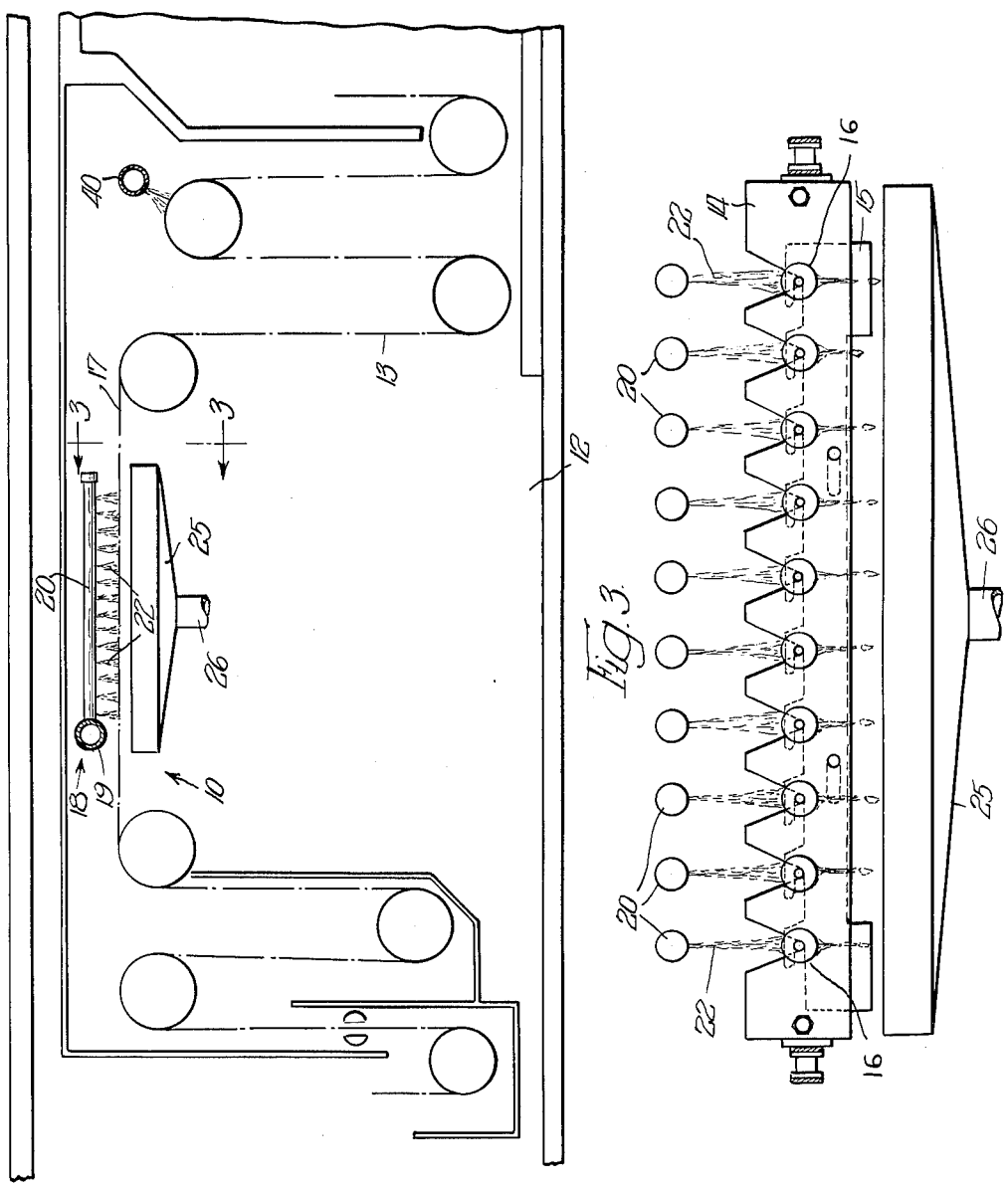

United States Patent Office 3,255,689
Patented June 14, 1966

3,255,689
LIQUID SMOKING MEANS
Elwood W. Kielsmeier, Edward Schmook, Jr., William R. Macaulay, and Robert H. Wandel, Madison, Wis., assignors to Oscar Mayer & Co. Inc., Chicago, Ill., a corporation of Illinois
Filed May 6, 1963, Ser. No. 278,310
2 Claims. (Cl. 99—234)

This invention relates to the application of so-called "liquid smoke" to linked sausage items such as wieners and smokie links, and more particularly to means for treating a linked sausage product with liquid smoke as the product is being advanced in a continuous manner by conveyor means. The term "liquid smoke" is used herein to designate a solution of smoke-flavor imparting ingredients derived from wood smoke.

It is well known to smoke various meat products including linked sausage products such as wieners and smokie links. The conventional commercial procedure for smoking wieners or the like has been to burn a selected wood sawdust and direct the smoke therefrom to a smokehouse through which the smoke is distributed in gaseous form for contact with sausage products suspended on racks.

Recently, considerable progress has been made in converting the conventional batch process of manufacturing smoked sausage products to a continuous process with one step or phase of the continuous process being the treatment of the meat product with wood smoke by advancing the product through a chamber filled with gaseous smoke. However, such a smoking step in continuous processes requires a considerable portion of the entire processing cycle, and it is the most difficult to control primarily because of variations in smoke density.

Accordingly, it is a primary object of this invention to provide new and improved means for treating linked sausage products with a liquid smoke composition.

It is another object of this invention to provide new and improved means for treating linked sausage products with a liquid smoke composition, which means is adapted to treat the links as the same are advanced in end-to-end connected relationship by conveyor means as in a continuous process.

It is another object of this invention to provide new and improved means for treating linked sausage products with a liquid smoke composition, which means includes dispensing means for discharging the liquid smoke in a plurality of streams directly onto the surface of the linked sausage products.

It is still another object of the present invention to provide new and improved means for treating linked sausage products with a liquid smoke composition, which means includes dispensing means having a plurality of orifices for discharging the liquid smoke in a plurality of streams directly onto the surface of the linked sausage product, the size of the orifices, the velocity of the streams and the distance between the orifices and the product being so correlated that the liquid smoke forms a thin film substantially covering the linked sausage products.

It is even another object of the present invention to provide new and improved means for treating linked sausage products with a liquid smoke composition, which means includes the provision of recirculating the liquid smoke and accurately controlling the quality of the same.

These and other objects and advantages of the present invention will become apparent from the following specification wherein like numerals refer to similar parts throughout.

In the drawings:

FIG. 1 is a partial perspective and partial diagrammatic view of one embodiment of the liquid smoking means of this invention showing the same treating linked sausage products being advanced by conveyor means;

FIG. 2 is a side elevation, largely diagrammatic, illustrating the smoking chamber of a sausage linking, conveying and processing apparatus in which the liquid smoking means of this invention may be used;

FIG. 3 is an enlarged section taken along line 3—3 of FIG. 2; and

FIG. 4 is an enlarged section taken along line 4—4 of FIG. 1.

Briefly and by way of introduction, the liquid smoking means of this invention is adapted to be mounted in the smoking chamber or zone of an apparatus adapted to link, convey, and process continuously sausage products such as wieners or smokie links. Such an apparatus includes an endless conveyor which may be provided with a relatively short horizontal run portion for advancing a plurality of side-by-side lengths of linked sausage products along a horizontal linear path. The liquid smoking means includes liquid smoke dispensing means mounted above the conveyor. The dispensing means includes a plurality of distributor pipes mounted in closely spaced relation above the horizontal run portion of the conveyor and extending parallel with the linear path of travel of the sausage products. Each distributor pipe is mounted over one of the lengths of end-to-end connected links and each distributor pipe is provided with a plurality of downwardly disposed orifices spaced along the length thereof for discharging liquid smoke in a plurality of streams directly onto the surface of the linked sausage products. Preferably, the size of the orifices, the velocity of the streams and the distance between the orifices and the conveyor means are so correlated that the liquid smoke forms a thin film substantially covering the linked sausage products. Drain means are mounted in the smoking chamber beneath the dispensing means and the horizontal run portion of the conveyor for collecting excess liquid smoke applied to the linked sausage products. Suitable conduit means are provided connecting the dispensing means with the drain means, and pumping means are provided in the conduit means for recirculating the liquid smoke between the drain means and the dispensing means. Also, heating means are provided in the conduit means for maintaining the temperature of the liquid smoke at a desired value.

Now referring to the drawings, it will be seen that the liquid smoking means, generally designated 10, is adapted to be mounted in a smoking chamber 12 of an apparatus for linking, conveying and processing sausage products in a continuous manner, such as the apparatus disclosed in United States Patent 3,059,272 to Millenaar, for example. The apparatus disclosed in Millenaar is adapted to process a plurality to stuffed sausage casing, which casings are first divided into link forming sections by constricting the casings at intervals, after which the links are held in end-to-end connected relationship and carried by an endless conveyor through a series of chambers in which they are smoked, cooked and otherwise processed for marketing.

The Millenaar apparatus includes an endless continuously traveling chain conveyor 13 which is mounted on a plurality of supporting sprockets, and the conveyor includes a plurality of transversely extending cross bars 14 and locking bars 15 (FIG. 3) at spaced apart points along the length of the conveyor for holding a plurality of lengths of linked sausages 16 in parallel spaced-apart relationship and for advancing the linked sausages through the apparatus. Conveyor 13 includes a relatively short horizontal run portion 17 for advancing the lengths of linked sausage products along horizontal linear paths.

Liquid smoking means 10 includes dispensing means, generally designated 18, suitably mounted in smoking chamber 12 above the horizontal run portion 17 of the conveyor for dispensing a liquid smoke composition. The dispensing means includes a header pipe 19 having a plurality of parallel spaced-apart distributor pipes 20 connected to pipe 19 along the length thereof. It will be understood that the interior of each distributor pipe 20 is in communication with the interior of header pipe 19 for permitting a liquid smoke composition to flow from the header pipe to the distributor pipes. As best seen in FIG. 3, each distributor pipe 20 is mounted in closely spaced relation over the horizontal run portion of the conveyor and laterally positioned over the path of one of the lengths of linked sausages. Each distributor pipe 20 is closed or capped at the end thereof remote from header pipe 19, and each distributor pipe includes a plurality of downwardly disposed apertures 21 (FIG. 4) spaced-apart along the length thereof for discharging a liquid smoke composition in a plurality of streams 22 directly onto the surface of the linked sausage products being advanced by conveyor 13.

The liquid smoking means of this invention further includes drain means in the form of a horizontally disposed generally rectangular shaped pan 25. The pan is supported beneath dispensing means 18 and beneath horizontal run portion 17 of the conveyor by appropriate support means for collecting excess liquid smoke which runs or drips from the lengths of linked sausage products. A drain conduit 26 extends from the lowermost portion of the base of pan 25 to a hopper 27. A suitable pump 28 driven by a motor 29 is provided for pumping liquid smoke from hopper 27 through a conduit 30 to a heater 31. Heater 31 is preferably of the electric type having a thermostatic control 32 associated therewith. Liquid smoke flows from heater 31 through a further conduit 33 to a three-way valve 34. A conduit 35 communicates one opening of valve 34 with header pipe 19. Another opening in the three-way valve is in communication with a conduit 36, which conduit is in communication with hopper 27. The three-way valve, which may be manually operated or which may be remotely operated by suitable means, is provided for by-passing the flow of liquid smoke from the dispensing means 18 during warm-up of the liquid smoking means when the liquid smoke is being brought up to its desired temperature.

The liquid smoking means of this invention is provided with rinsing means for removing residual liquid smoke from the linked sausage product after the same have been allowed to absorb the desired amount of liquid smoke. Such rinsing means is shown in the form of a horizontally disposed conduit 40 mounted transverse to the lengths of linked sausage products 16 slightly above the latter. It will be understood that conduit 40 is provided with a plurality of downwardly disposed openings, which openings are spaced apart along the length of conduit 40 corresponding to the lateral spacing of the lengths of linked sausage products. Water is pumped through conduit 40 by appropriate means for rinsing the linked sausage products after they have been treated with the liquid smoke composition by dispenser 18. The tubular rinsing conduit is spaced "downstream" a sufficient distance from the dispensing means to allow the linked sausage products to absorb the liquid smoke for a predetermined length of time before the residual smoke is rinsed from the products. The length of time between application of liquid smoke and rinsing is a primary factor in determining the amount of liquid smoke absorbed by the products, i.e., a greater period of time between liquid smoke application and rinsing results in a greater amount of liquid smoke absorbed. The provision of the rinsing means provides a positive and accurate means of controlling the amount of smoke absorbed by the products for providing products having uniform smoke flavor properties. Further, rinsing of the products prevents spotting on the surfaces of the products by residual smoke droplets which tend to adhere to the products until the latter are rinsed.

Manifestly, the length of time between liquid smoke application and rinsing may be controlled by varying the distance between the liquid smoke dispensing means and rinsing means (as measured along the length of the conveyor) and/or by varying the speed of travel of the conveyor. It will be realized that in some installations it may be desired to dispense with liquid rinsing means and rely on evaporation or other means for removal of residual liquid smoke.

It is believed to be apparent from the foregoing that the lengths of linked sausage products are treated with liquid smoke by being passed beneath the downwardly flowing streams of liquid smoke being discharged from the distributor pipes of the dispensing means. Excess liquid smoke running or dripping from the linked sausage products is collected in the drain means and recirculated to the dispensing means. In the preferred form of the invention, the size of orifices 21, the rate of discharge of liquid smoke streams 22 and the distance between the distributor pipes and the horizontal run portion of the conveyor are so correlated that the liquid smoke forms a thin film substantially enclosing or sheathing the linked sausage products as indicated in FIG. 4, thereby resulting in uniformly covering the links with liquid smoke for improved smoking of the same. By this orifice construction, substantially all of the liquid smoke composition discharged is brought into contact with the surface of the linked sausage products. This keeps the amount of liquid smoke recirculated at a minimum making it easier to control the quality, temperature etc. of the recirculating liquid smoke composition.

The following specific example of the operation of the liquid smoking means of this invention treating linked sausage products is disclosed for purposes of illustrating the operation of the liquid smoking means and not for limiting the same in any way.

Production wiener batter, for example, is stuffed into elongated lengths of casing and linked into links of linked sausages held in end-to-end connected relationship and advanced by a conveyor of the type shown in the above referred to Millenaar patent. Each distributor pipe is provided with orifices 21 having a $3/32$ inch diameter, and the orifices are equally spaced-apart at one inch spacings over a length of twenty inches in each of the distributor pipes. Hopper 27 is filled with a water-solution of wood smoke or wood smoke condensate. Such a smoke solution is commercially available under the trade name Charsol made by Red Arrow Products Corporation of Manitowoc, Wisconsin.

Pump 28 is started, heater 31 energized and three-way valve 34 actuated for communicating conduit 33 with conduit 36, thereby by-passing dispensing means 18. The liquid smoke composition is circulated between hopper 27 and heater 13 until the temperature of the liquid smoke is brought to approximately 130° F. The particular temperature of the liquid smoke is not critical; the liquid need only be maintained in its liquid state and below its boiling point. After the liquid smoke is brought to a temperature of approximately 130° F., three-way valve 34 is actuated to communicate conduit 33 with conduit 35, thereby permitting the liquid smoke composition to flow to dispensing means 18 for discharge from the orifices of the distributor pipes, collection in drain pan 25 and return to hopper 27 through conduit 26. Liquid smoke is discharged from orifices 21 at the rate of approximately seven gallons per minute. Preferably, the liquid smoke composition is recirculated through the dispensing means and drain pan for warming of these parts of the liquid smoking means. Thermostat 32 of heater 31 is set to maintain the recirculating liquid smoke composition at a temperature between 100 and 120° F. Lengths of linked sausage products are then advanced beneath the streams of liquid smoke being discharged from orifices 21 of the distributor pipes. The total liquid smoke contact time per link is approximately one minute.

Manifestly, this factor will be determined by the speed of travel of the linked sausage products and by the total spacing of the orifices along the distributor pipes. The smoked linked sausage products are allowed to travel for approximately 135 seconds before they are rinsed with 68° F. water from rinse conduit 40. It has been found that the linked sausage products absorb a significant amount of smoke during the time they travel between the dispensing means and the rinse conduit. After rinsing the wieners are passed through one or more cooking zones in the above referred to Millenaar apparatus after which time the wieners may be chilled by immersion in a brine bath for ten minutes at approximately 0° F.

In an actual test run wieners were smoked in accordance with the foregoing example. These wieners were found to compare favorably in all respects with the wieners smoked by conventional means, i.e., those smoked by gaseous smoke in a smokehouse. In other words, wieners smoked by the liquid smoking means of this invention were found to have the same general characteristics as conventional smoked wieners.

It is believed to be apparent from the foregoing that this invention provides new and improved means for smoking linked sausage products. The liquid smoking means of this invention readily adapts itself for incorporation in an apparatus wherein lengths of linked sausage products are linked, conveyed and processed in a continuous manner. The liquid smoking means of this invention possess a number of advantages over conventional smoking means such as substantial reduction of smoke application time, better control over the amount and qualify of the smoke applied to the products, and substantial reduction in the size of the smoking zone or chamber of the apparatus in which the liquid smoking means of this invention is used. For instance, it will be apparent that the linked sausage products are rapidly smoked by being brought into direct contact with the liquid smoke composition. Further, it will be realized the quality, temperature, etc. of the liquid smoke may be easily controlled by virtue of the recirculating provision of the liquid smoking means, e.g., the recirculating liquid smoke may be filtered or mixed with desired additives as it recirculates. Also, the amount of liquid smoke absorbed by the products is accurately controlled by means of the rinsing means. Further, it will be appreciated that the liquid smoking means require little space along the length of a conveyor in a continuous processing apparatus thereby allowing the apparatus to be of reduced size.

While the invention has been shown in but one form it will be obvious to those skilled in the art that it is not to be so limited, but on the contrary the invention is susceptible of various changes and modifications without departing from the spirit and scope of the appended claims. For instance, it will be appreciated that other forms of orifices could be provided in the dispensing means while still accomplishing the objectives of the present invention. As an example, a long narrow continuous groove could be provided in the base of each of the distributor pipes in lieu of the spaced-apart individual orifices. In this manner liquid smoke would be discharged from the distributor pipes in a thin liquid film for contact with the surfaces of the linked sausage products for forming a thin liquid film substantially covering the latter.

We claim:

1. In an apparatus for continuously making linked sausage products, the combination comprising, conveyor means for advancing a plurality of continuous rows of linked sausage products, wherein each row consists of a plurality of said products linked together in end-to-end relation, said conveyor including means for holding the rows of said products in parallel spaced-apart relation and said conveyor means including a horizontal run for advancing said products in end-to-end relation along substantially horizontal, separate, linear paths, a drain pan mounted beneath the horizontal run of said conveyor and having a drain opening, dispensing means including a plurality of distributor pipes equal in number to the number of rows of said products, said pipes being mounted above the horizontal run portion of said conveyor in close, parallel, spaced relation with the respective horizontal paths of movement of said rows of products, which pipes extend over substantially the full length of said pan, each of said pipes having a plurality of downwardly disposed orifices spaced along the length thereof, which orifices are each shaped for discharging liquid smoke in the form of a stream directed onto the surface of said products for forming a thin film substantially covering the same, conduit means connecting each of said pipes with said drain opening, pumping means in said conduit means for re-circulating liquid smoke between said drain pan and said dispensing means.

2. The combination according to claim 1 further defined by fluid rinsing means mounted adjacent said conveyor and downstream of said dispensing means for rinsing said products after the application of liquid smoke thereto.

References Cited by the Examiner

UNITED STATES PATENTS

| | | | |
|---|---|---|---|
| 511,288 | 12/1893 | Chase. | |
| 1,664,637 | 4/1928 | Merseles et al. | 134—72 X |
| 1,740,979 | 12/1929 | Golrick | 118—602 X |
| 1,943,775 | 1/1934 | H. F. Taylor | 134—72 X |
| 1,960,516 | 5/1934 | H. P. Taylor | 99—229 |
| 2,011,107 | 8/1935 | Lape | 134—72 X |
| 2,054,625 | 9/1936 | Griffith | 99—159 X |
| 2,675,753 | 4/1954 | Eber | 99—261 |
| 2,721,144 | 10/1955 | Penley | 118—50 X |
| 2,915,023 | 12/1959 | Rapaport | 118—602 X |
| 2,930,310 | 3/1960 | Poppenberg | 99—261 |
| 2,973,277 | 2/1961 | Barnett et al. | 99—260 X |
| 3,049,135 | 8/1962 | Kuhl et al. | 134—72 |
| 3,059,272 | 10/1962 | Millenaar | 17—34 |

WALTER A. SCHEEL, *Primary Examiner.*

JEROME SCHNALL, ROBERT E. PULFREY,
*Examiners.*

E. HOROWITZ, C. I. COUGHENOUR,
*Assistant Examiners.*